United States Patent [19]

Rosene et al.

[11] Patent Number: 5,752,424
[45] Date of Patent: May 19, 1998

[54] RELEASABLE TOOL PIECE PUNCH ASSEMBLY

[75] Inventors: Ronald G. Rosene, Coon Rapids; Richard L. Timp, Vadnais Heights; David M. Runk, Stillwater, all of Minn.

[73] Assignee: Wilson Tool International, Inc., White Bear Lake, Minn.

[21] Appl. No.: 480,308

[22] Filed: Jun. 6, 1995

[51] Int. Cl.$^6$ ...................................... B26F 1/14
[52] U.S. Cl. .............................. 83/686; 83/698.91
[58] Field of Search ...................... 83/698.91, 684, 83/686

[56] References Cited

U.S. PATENT DOCUMENTS

| | | |
|---|---|---|
| 1,602,708 | 10/1926 | Russell . |
| 1,740,645 | 12/1929 | Currier . |
| 2,475,861 | 7/1949 | Thalmann . |
| 2,618,940 | 11/1952 | Wyzenbeek . |
| 2,684,491 | 7/1954 | Roddick . |
| 2,733,926 | 2/1956 | Colton . |
| 2,807,473 | 9/1957 | Kiehne . |
| 2,990,188 | 6/1961 | Better et al. . |
| 3,436,086 | 4/1969 | Glenzer . |
| 3,521,895 | 7/1970 | Smith . |
| 3,548,700 | 12/1970 | Herzog et al. ............... 83/698.91 |
| 3,633,931 | 1/1972 | Bilz . |
| 3,652,099 | 3/1972 | Bilz . |
| 3,674,281 | 7/1972 | Hedrick . |
| 3,708,178 | 1/1973 | Lauricella . |
| 3,734,516 | 5/1973 | Smith . |
| 3,801,115 | 4/1974 | Benjamin . |
| 3,851,890 | 12/1974 | Smith . |
| 3,947,047 | 3/1976 | Hultman . |
| 3,985,368 | 10/1976 | Better et al. . |
| 4,184,692 | 1/1980 | Benson et al. . |
| 4,231,581 | 11/1980 | Benedict . |
| 4,234,277 | 11/1980 | Benson et al. . |
| 4,309,042 | 1/1982 | Fauth et al. . |
| 4,319,577 | 3/1982 | Bofinger et al. . |
| 4,347,753 | 9/1982 | Claussen et al. . |
| 4,577,875 | 3/1986 | Miyakawa . |
| 4,708,548 | 11/1987 | Taylor et al. . |
| 4,745,674 | 5/1988 | Abe et al. . |
| 4,818,167 | 4/1989 | Hatsutori ....................... 411/386 |
| 4,858,939 | 8/1989 | Riggs . |
| 5,188,378 | 2/1993 | Erlenkeuser . |
| 5,301,580 | 4/1994 | Rosene et al. ................. 83/698.91 |

Primary Examiner—Kenneth E. Peterson
Assistant Examiner—Sean A. Pryor
Attorney, Agent, or Firm—Fredrikson & Byron, PA

[57] ABSTRACT

A punch assembly to which a tool piece is easily attached and removed. A punch body is provided at its lower end with a fixed locking element having a tool receiving basin. The annular wall defining the basin has one or more holes through it and an annular, downwardly facing rim. A bearing is positioned within each hole for movement between a locked position and a released position. A moveable locking element having an interior surface with at least one recess alignable with the hole(s) and at least one platform also alignable with the hole(s) is slidably positioned with respect to the outer surface of the side wall for movement between a released position and a locked position. The moveable locking element is in the released position when the recess (es) are aligned with the hole(s) so that the bearing(s) may be at least partially received within the recess(es) to enable the tool piece to be removed from the basin. The tool piece may have a frustoconical portion received in the basin and held in the basin when the bearings are held in their locked positions.

5 Claims, 8 Drawing Sheets

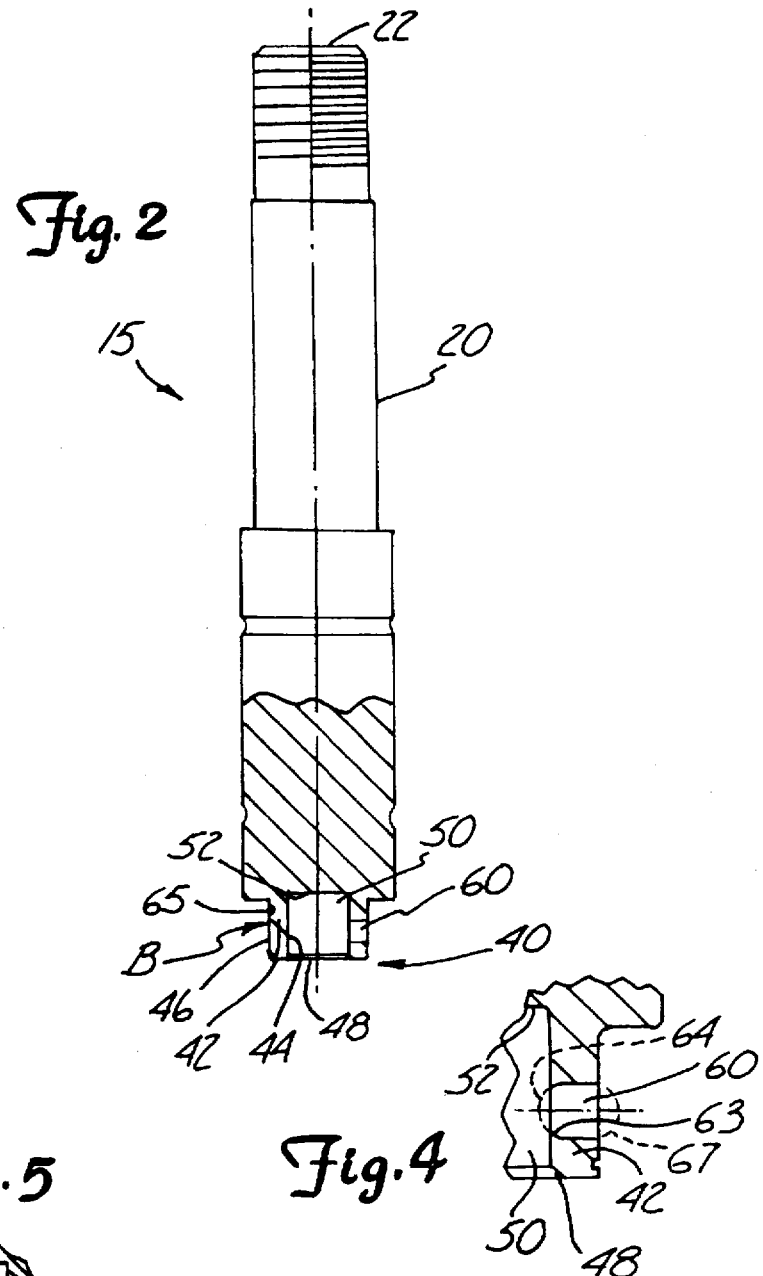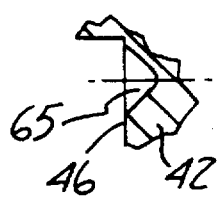

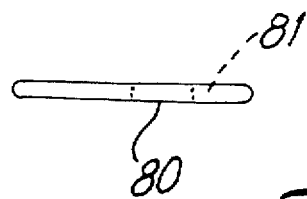
Fig. 10
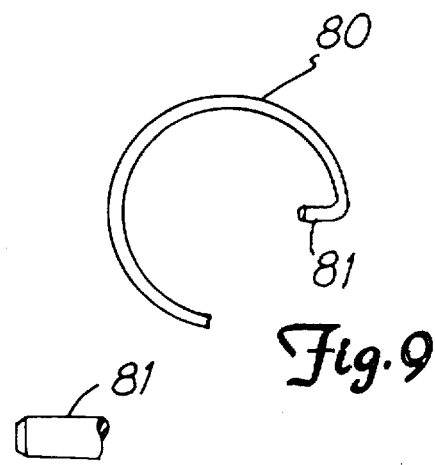
Fig. 9
Fig. 9A
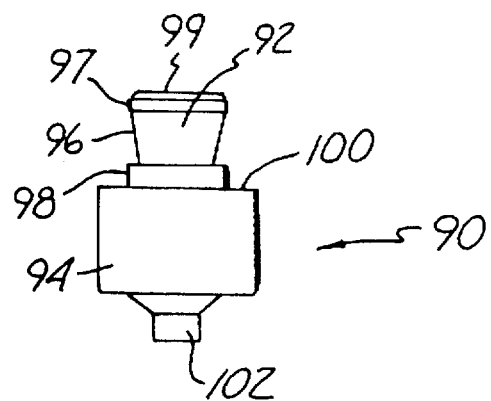
Fig. 11

RELEASABLE TOOL PIECE PUNCH ASSEMBLY

FIELD OF THE INVENTION

The present invention relates to quick release mechanisms for changing coining tools on punch assemblies used in punch presses.

BACKGROUND

A punch press commonly has a punch holder positioned between a workpiece support surface and a ram. In a multiple station turret punch press, the punch holder is a rotatable turret having a plurality of punch receiving apertures carried on the turret above the workpiece support surface and a corresponding plurality of die receiving frames carried below the workpiece support surface. A workpiece control mechanism is included that moves a workpiece in a precise and predetermined manner on the support surface.

A conventional punch assembly includes a punch guide, a punch body, and a punch tip fixedly attached to the punch body. The punch body and punch tip are positioned in the punch guide for reciprocal, axial movement along the longitudinal axis of the punch guide, and the guide itself is positioned within a punch-receiving aperture in the punch holder, all in a manner known to the art. In a typical punching operation, a workpiece is clamped in a desired position on the support surface, and the turret is rotated to bring a selected punch and die combination to the punch station. The ram then strikes the punch on a downward stroke and drives the punch tip into contact with the workpiece with considerable force.

Coining tools are punch tips having small, intricate workpiece deforming surfaces. It is common to use several different coining tools to deform a single workpiece because more than one pattern is often desired. A diversity of patterns is presently obtained by replacing or changing out a punch assembly for each type of coining tool. Present coining tool operations are expensive because changing out a punch assembly for each coining tool is not only time consuming but also requires a separate punch assembly for each type of coining tool. Accordingly, a need exists to provide a single punch assembly to which a number of different coining tools may be quickly mounted and removed.

Tool piece release mechanisms have been provided for use with rotary action tools. Tool piece release mechanisms for rotary tools, however, are only marginally useful in connection with punch presses because punch presses subject punch assemblies to significant axial forces to which rotary tool pieces are rarely if ever exposed. One problem of some rotary tool piece release mechanisms is that the tool pieces could become fixedly jammed into the punch body when subjected to the axial forces in a punch press. Other problems caused by substantial axial force loading on known rotary tool piece release mechanisms may involve transverse pivoting of the tool piece with respect to the longitudinal axis of the body, and forces may be concentrated in either the tool piece or the punch body.

A need exists to provide a tool piece release mechanism in punch assemblies that prevents a tool piece from becoming fixedly jammed into the punch body, or pivoting transversely with respect to the longitudinal axis of the punch body, and that avoids concentrating forces in either the tool piece or the punch body.

SUMMARY OF THE INVENTION

The present invention provides a tool piece release mechanism in a punch assembly and a tool piece that can withstand the axial forces generated in punch press operations. In one embodiment, a punch assembly includes a punch body extending from an upper end positioned towards a reciprocating ram to a lower end positioned towards a workpiece. A fixed locking element having a tool receiving basin defined by a side wall is positioned at the lower end of the punch body. The side wall of the fixed locking element includes an inner surface, an outer surface, one or more holes extending transversely from the inner surface to the outer surface, and a rim. The surface of the rim of the fixed locking element is substantially normal to the longitudinal axis of the punch body. A bearing is positioned within each hole for movement between a locked position and a released position. A moveable locking element having an interior surface with at least one recess alignable with the hole(s) and at least one platform also alignable with the hole(s) is slidably positioned with respect to the outer surface of the side wall for movement between a released position and a locked position. The moveable locking element is in the released position when the recess(es) are aligned with the hole(s) so that the bearing(s) may be at least partially received within the recess(es) to enable the tool piece to be removed from the basin. The moveable locking element is in the locked position when the platform(s) are aligned with the hole(s) so that the bearing(s) are urged at least partly into the basin to engage the tool piece and prevent it from being removed from the basin.

The punch assembly further includes a releasable tool piece with a shank and an outwardly extending, axially facing compression shoulder adapted to engage the rim of the fixed locking element. The shank has a bearing contact surface that may be shaped like an inverted, truncated cone, and the outwardly extending shoulder is substantially normal to the longitudinal axis of the punch body. The tool piece is attached to the punch body by positioning the moveable locking element in the released position, inserting the shank into the tool receiving basin, and then positioning the moveable locking element in the locked position. In operation, the axial forces are transmitted from the rim of the fixed locking element to the upper surface of the outwardly extending compression shoulder of the tool piece.

An objective of the present invention is to provide a tool piece release mechanism in a punch assembly that prevents the tool piece from becoming fixedly jammed into the punch body. Another objective of the present invention is to prevent the tool piece from pivoting transversely with respect to the longitudinal axis of the punch body during a punching operation. Yet another objective of the present invention is to distribute the axial forces equally across the tool piece and the punch body to reduce the concentration of stress in the punch body and the tool piece.

These and other features of the invention will become more apparent upon reference to the following description of preferred embodiments and the drawing.

BRIEF DESCRIPTION OF THE DRAWINGS

FIG. 2 is a front view in partial cross section of the punch body shown in FIG. 1;

FIG. 3 is a bottom view of a punch body of the present invention;

FIG. 4 is a partial cross-sectional view of a fixed locking element of the present invention taken along line A—A of FIG. 3;

FIG. 5 is an enlarged cross-sectional view of a fixed locking element of the present invention shown at B in FIG. 2;

FIG. 9 is a top view of a C-ring used in the moveable locking element of the present invention, and FIG. 9A is an enlarged portion of FIG. 9;

FIG. 10 is a front view of the C-ring shown in FIGS. 9 and 9A;

FIG. 11 is a front view of a removable tool piece in accordance with the present invention;

FIG. 12A is a partial cross-sectional view of a punch assembly of the invention taken along line 12—12 of FIG. 12;

DETAILED DESCRIPTION OF A PREFERRED EMBODIMENT

Figure 1:
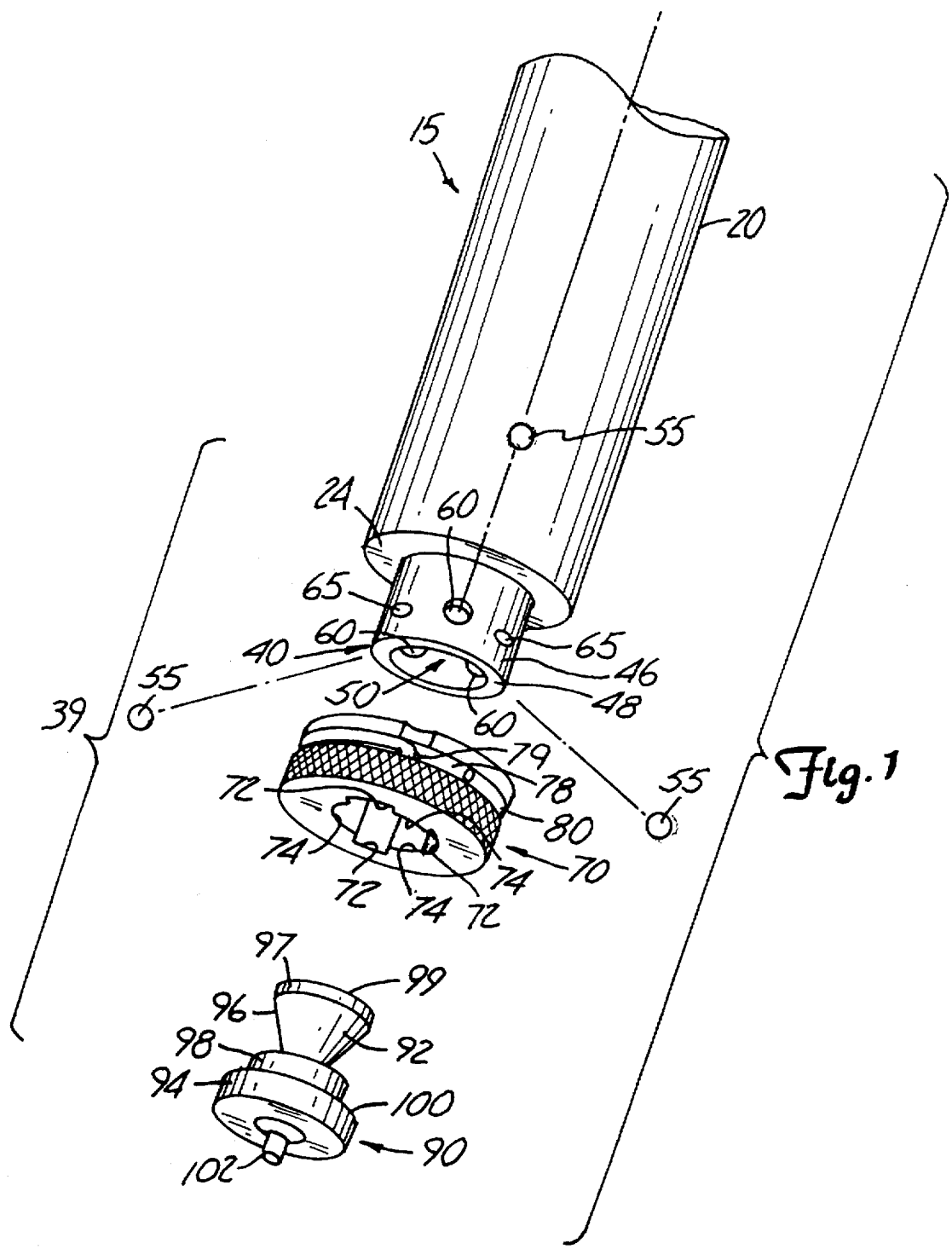
FIG. 1 is an exploded perspective, broken-away view of a releasable tool piece punch assembly in accordance with the present invention.
Figure 6:
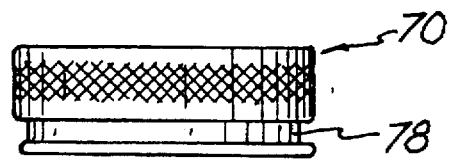
FIG. 6 is a front view of a moveable locking element of the present invention.
Figure 7:
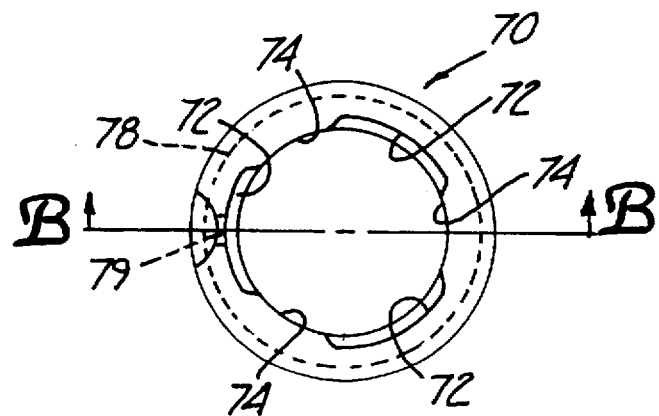
FIG. 7 is a top view of a moveable locking element shown in FIG. 6.
Figure 8:
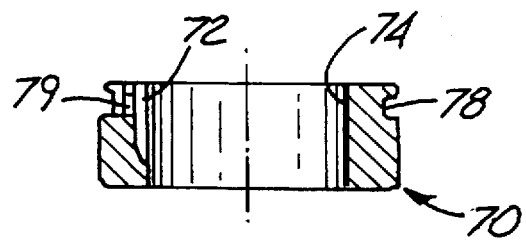
FIG. 8 is a cross-sectional view of a moveable locking element taken along line B—B of FIG. 7.

A releasable tool piece punch assembly 15 embodying the invention is illustrated in FIG. 1. The punch assembly 15 has an elongated and generally vertical body 20 that is receivable in a punch receiving aperture of a punch press for axial movement between a raised position and a workpiece-deforming depressed position. The body includes an upper end (not shown) adapted to be struck by the ram of the punch press, and a lower end 24 that carries a tool piece locking mechanism shown generally at 39.

The locking mechanism 39 includes a fixed locking element 40 which may be a lower extension of the punch body 20 and a moveable locking element 70. Referring to FIGS. 1–5, the fixed locking element 40 includes an annular retaining wall 42 having an inner surface 44, an outer surface 46 and a downwardly facing rim 48. The inner surface 44 of the wall 42 defines a tool receiving basin 50 having a base 52. As shown in FIGS. 1–3, the outer surface 46 of the side wall is positioned radially inwardly from the outer perimeter of the punch body 20, and the outer and inner surfaces 46, 44 are concentric cylinders so that the retaining wall 42 is circular in cross-section and the tool receiving basin 50 is cylindrical.

At least one hole 60 extends through the wall 42 from the inner surface 44 to the outer surface 46. As shown in FIGS. 1 and 3, the fixed locking element 40 has one or more holes 60, preferably three in number, spaced at substantially equal radial increments around the side wall 42, but the invention is not limited to any specific number of holes. In alternative embodiments, two holes 60 (not shown) may be positioned in the side wall 42 diametrically opposed to each other, or four or more holes may be positioned in the side wall 42.

Each hole 60 has a retaining rim 63 (FIG. 4) positioned towards the inner side wall and angled inwardly for preventing a bearing 55 received in the hole from completely entering the tool receiving basin 50 in the absence of a tool piece 90.

Referring to FIGS. 2 and 5, one or more dimples 65 are located on the outer surface 46 of the side wall 42. Preferably, the number and radial spacing of the dimples 65 is equal to that of the holes 60, and each dimple 65 is positioned midway between neighboring holes 60. In a preferred embodiment, three holes 60 are spaced at 120° increments and three dimples 65 are spaced from one another at 120° increments and shifted from the holes by 60°. In one embodiment (not shown), two holes 60 are spaced at 180° increments and the dimples 65 are spaced from one another at 180° increments and shifted from the holes by any convenient radial increment such as 90° or 45°. In another alternative embodiment (not shown), four holes 60 are spaced at 90° increments and the dimples 65 are spaced from one another at 90° increments and shifted from the hole by a convenient radial increment such as 45°.

Figure 12:
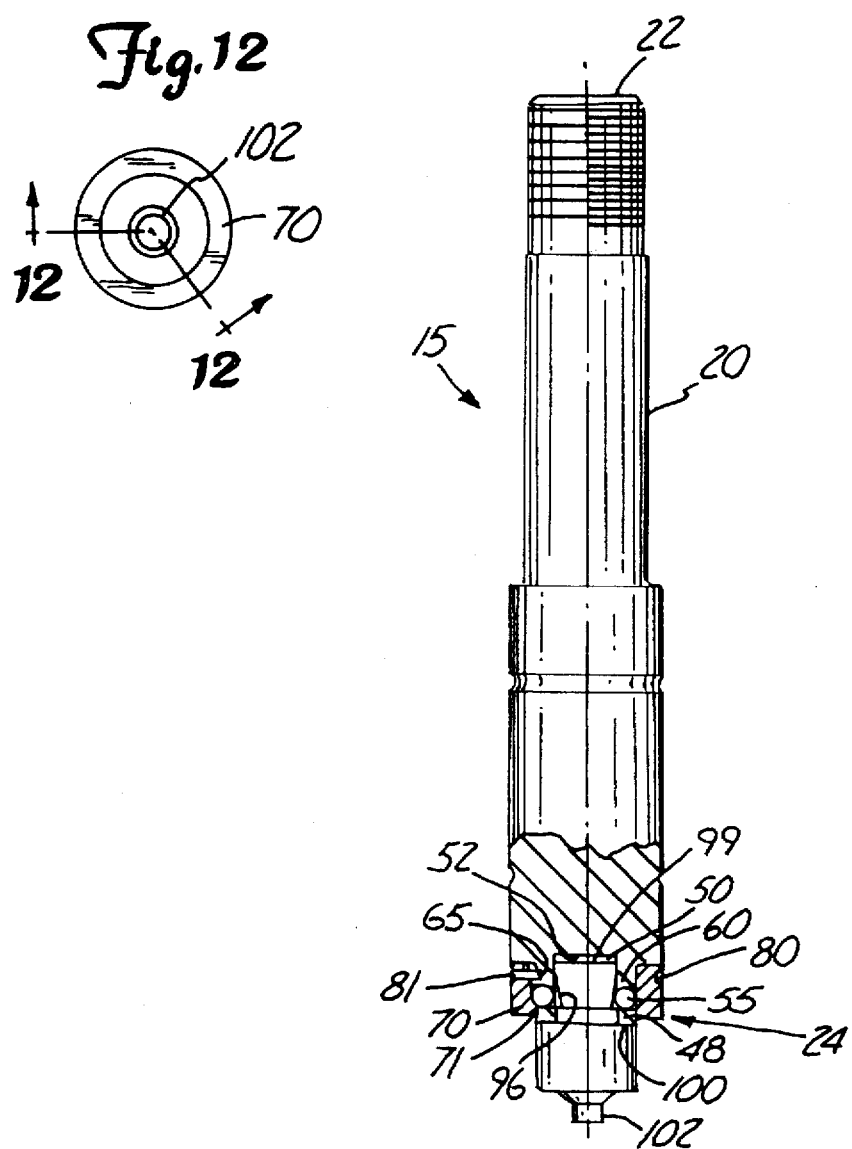
FIG. 12 is a bottom view of one embodiment of a releasable tool piece punch assembly in accordance with the present invention in the locked position.

A bearing 55 is slidably positioned in each hole 60 as shown in FIGS. 1 and 12A. The bearing 55 may be spherical balls of hardened steel, or elongated pins having rounded ends or any other suitable shape. Referring to FIG. 4, each bearing 55 is moveable within its corresponding hole 60 between a locked position shown by phantom line 64 and a released position shown by phantom line 67.

The moveable locking element 70 abuts the outer surface 46 of the wall 42. The moveable locking element 70 desirably is shaped as an annular ring sized to be slidably received around the outer annular surface 46 of the wall 42. It has at least one radially inwardly open recess and at least one radially inwardly extending platform, and is slidably positionable with respect to the fixed locking element 40 between released and locked positions. The movable locking element 70 is in the released position when its recesses are aligned with the holes 60 so that the bearings 55 may be at least partially received in the recesses; and the moveable locking element is in its locked position when the platforms are aligned with the holes 60 to thereby urge the bearings partially into the tool receiving basin 50.

Referring to FIGS. 1 and 6–10, the moveable locking element 70 preferably has three recesses 72 and three platforms 74. The radial spacing of the recesses 72 and platforms 74 is similar to the radial spacing of the holes 60. In the embodiment having three recesses and platforms, the recesses 72 are spaced from one another at 120° increments and the platforms are spaced from one another at 120° increments. Each platform 74 is preferably positioned midway between adjacent recesses. It will be appreciated that the spatial relationship of the recesses 72 and the platforms 74 is dependent upon the spatial relationship of the holes 60 in the fixed locking element 40. Accordingly, the number of recesses 72 and platforms 74 on the moveable locking element 70 is preferably equal to the number of holes 60 in the fixed locking element 40; and the angular spacing of both the recesses and the platforms on the moveable locking element is generally equal to the spacing of the holes on the fixed locking element. In this manner, when the element 70 is in the released position, a recess 72 is aligned with each hole 60 to receive a bearing 55. When the element 70 is in the locked position, a platform 74 is aligned with each hole to prevent a bearing from withdrawing from the hole.

The moveable locking element 70 preferably includes a C-ring 80 having a radially inwardly projecting pin 81 with desirably a rounded or bevelled end as shown in FIG. 9A. The annular portion of the C-ring 80 is received in an annular groove 78 extending about a major portion of the outer perimeter of the moveable locking element 70, and the pin 81 passes through a radial aperture 79 in the element 70 into one of the recesses 72.

In operation, the pin 81 slides in and out of a dimple 65 as the moveable locking element 70 is rotated with respect to the fixed locking element 40. The pin 81 rests in the dimple 65 when the moveable locking element 70 is in the locked position to prevent movement between the moveable locking element 70 and the fixed locking element 40. As the moveable locking element 70 is rotated about the fixed locking element 40 toward the released position, the pin 81 slides out of the dimple 65 and over the outer surface 46 of the side wall 42.

The fixed locking element 40 and moveable locking element 70 work in concert with a tool piece 90 to releasably attach the tool piece 90 to the punch body 20. Referring to FIGS. 1 and 11, the tool piece 90 has a shank 92 having a mid-section 94, and a workpiece-deforming tip 102. The shank 92 includes an upper end surface 99, upper and lower axially spaced, cylindrical stabilizing surfaces 97, 98, and a desirably frustoconical retaining surface 96 positioned therebetween. The upper and lower stabilizing surfaces 97, 98 preferably slidably mate with the inner surface 44 of the tool receiving basin 50 so that the stabilizing surfaces 97, 98 have substantial surface to surface contact with the inner surface 44. The retaining surface 96 is inclined at an acute angle with respect to the longitudinal axis of the punch body towards the workpiece deforming tip. In a preferred embodiment, the retaining surface 96 is a truncated cone having its base at the stabilizing surface 97. The mid-section 94 extends downwardly from the stabilizing surface 97, and the workpiece-deforming tip 102 extends downwardly from the mid-section 94. The mid-section 94 has an upwardly-facing, annular compression shoulder 100 positioned substantially normal to the axial movement of the punch 15 so as to uniformly engage the rim 48 of the fixed locking element in substantial surface to surface contact around the full perimeter of the rim 48. The operation of the locking mechanism 39 and the tool piece 90 will become more apparent by referring to the punch assemblies depicted in FIGS. 12 and 12A and FIGS. 13 and 13A.

FIG. 12A depicts a punch assembly 15 of the present invention in its locked position. The punch body 20 is generally positioned vertically so that its upper end 22 is positioned towards a ram in the punch press, and its lower end 24 is positioned towards a workpiece (not shown). The moveable locking element 70 abuts the fixed locking element 40 and is slidably retained thereto by a retaining ring 71. Shank 92 of the tool piece 90 is positioned in the tool receiving basin 50. The stabilizing surfaces 97, 98 abut the inner surface 441 and the compression shoulder 100 abuts the rim 48. The upper end surface 99 of the shank 92 preferably does not contact the end surface 52 of the tool basin 50, but such contact is contemplated for certain uses. The platform 74 is aligned with the hole 60 which urges the bearing 55 into contact with the retaining surface 96 of the tool piece, thereby locking the tool piece 90 to the punch body 20. In the locked position, the pin 81 is aligned with the depression 65 to prevent rotation between the moveable locking element 70 and the fixed locking element 40, the pin and dimple functioning as a detent mechanism.

To move the punch assembly 15 to the released position, the movable locking element is manually rotated to bring the recess 72 into alignment with the hole 60 so that the bearing 55 may be moved out of the tool receiving basin 50 and at least partially into the recess 72. The retaining surface 96 pushes the bearing 55 out of the tool receiving basin 50 as the tool piece is removed from the punch body 20. The moveable locking element 70 rotates with respect to the fixed locking element 40 once the pin 81 is disengaged from the dimple 65.

In addition to the structure described above with respect to the punch assembly 15 in FIGS. 12 and 12A, FIGS. 13 and 13A depicts the punch assembly 15 with a head ring 34 attached to the upper end 22 of the punch body by a set screw 35, and a punch guide 26 which receives the lower end 24 of the punch body 20 for axial and reciprocal movement therein. A spring 32 is coaxially positioned about the upper end 22 of the punch body 20 between the head ring 34 and an annular shoulder 28 on the upper end of the punch guide 26. A support ring 30 is positioned on the top of the punch guide 26 for further supporting the spring 32. A stripper plate 36 having an opening 37 with the same shape as the cross section of the mid-section 94 of the tool piece 90 is attached to the lower end of the punch guide 26.

Figure 13:
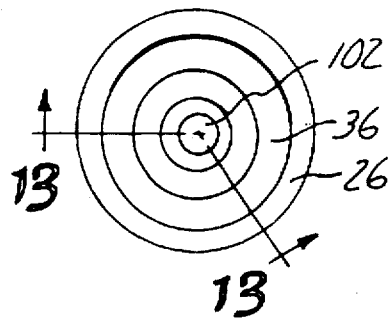
FIG. 13 is a bottom view of a releasable tool piece punch assembly in association with a punch guide.
Figure 13A:
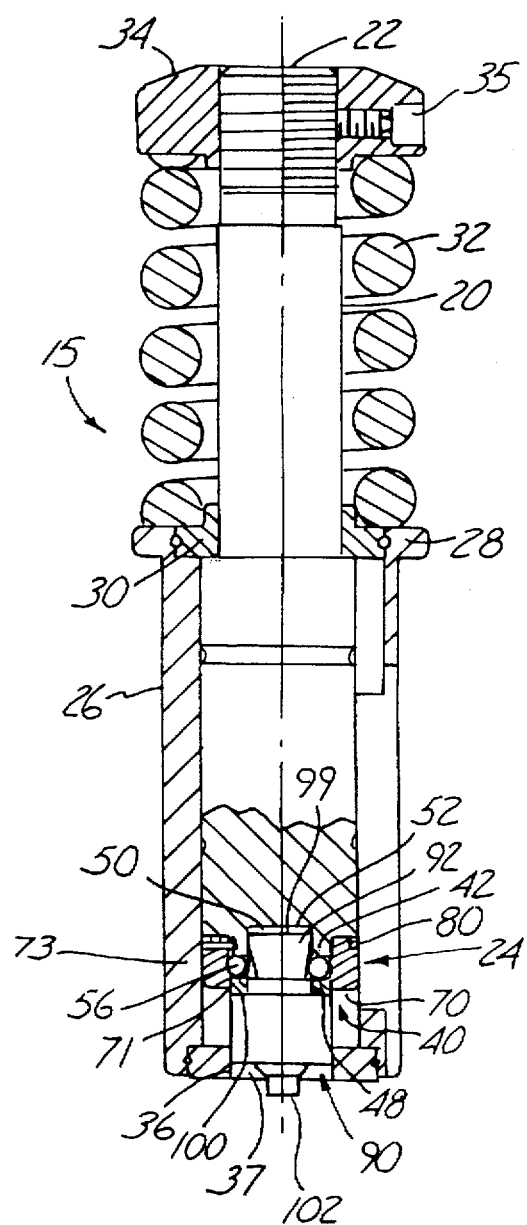
FIG. 13A is a partial cross-sectional view of a punch assembly taken along line 13—13 of FIG. 13.

The punch assembly 15 in FIGS. 13 and 13A is provided with further structure to prevent movement between the moveable and fixed locking elements. It will be observed that the pin 81 cannot slide out of the dimple 65 when the punch guide 26 is positioned over the locking mechanism 39 as shown. Accordingly, the moveable locking element 70 in this preferred embodiment is held in the locked position when the locking mechanism 39 is received within the punch guide 26.

The present invention provides a punch assembly with a tool piece locking mechanism and a tool piece that can withstand the significant axial force loading in punch press operations. The punch assembly prevents the tool piece 90 from becoming fixedly jammed in the punch body basin by transmitting the axial forces from the punch body 20 to the tool piece 90 through the interface between the rim 48 and the compression shoulder 100, both of which are substantially normal to direction of the axial force. By transmitting the axial force along surfaces that are substantially normal to the direction of the axial forces, the tool piece 90 avoids any tendency to pivot and become fixedly wedged in the tool receiving basin 50.

The present invention significantly reduces the tool piece's tendency to pivot with respect to the longitudinal axis of the punch body 20 under the significant axial force loading during punch press operations. Tool pieces are likely to pivot with respect to the punch body if the longitudinal centerline of the tool piece and punch body are not aligned with each other, the axial movement of the punch, or an axis normal to the workpiece. When such misalignment occurs, large moments are created in the tool piece which can damage the tool piece, the punch body or the workpiece. The punch assembly of the invention generally prevents the tool piece 90 from pivoting laterally by providing at least two stabilizing surfaces 97, 98 and a compression shoulder 100. By providing two stabilizing surfaces 97, 98, that substantially mate with the tool receiving basin 50, the tendency of the shank 92 to pivot about one of the stabilizing surfaces is opposed by an equal and opposite force by the other stabilizing surface. Accordingly, the two stabilizing surfaces reduce the shank's tendency to pivot about a single fulcrum on the tool receiving basin 50. The compression surface 100 also reduces the tool piece's tendency to pivot because it is located radially outward from the perimeter of the shank 92, and normal to the axial movement of the punch. Moreover, the end surface 99 does not act as a fulcrum about which the tool piece 90 can pivot because it does not contact the base 52.

The punch assembly also prevents the tool piece from concentrating forces in either the punch body 20, the locking mechanism 39 or the tool piece 90. Forces are not as likely to be concentrated in these pieces because the invention reduces the tool piece's tendency to pivot with respect to the punch body. Rather, the compressive forces are spread more or less evenly along the annular interface between the shoulder 100 and the rim 48. Moreover, to the extent that the tool piece 90 does pivot with respect to the punch body 20, the resulting concentration of forces are born by the thick sections of metal of the mid-section 94 and shank 92.

Figure 14:
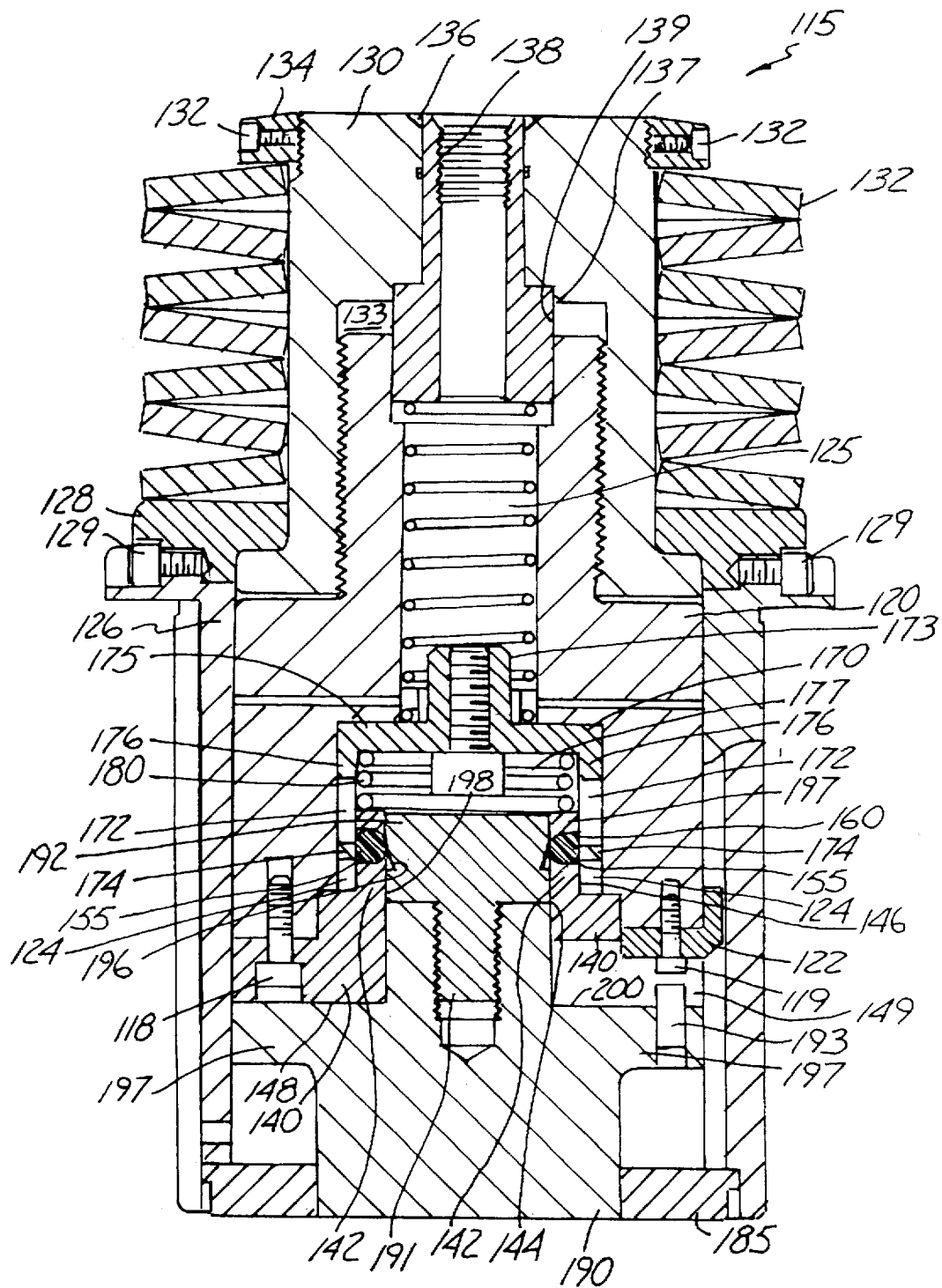
FIG. 14 is a cross-sectional view of another embodiment of the invention.
Figure 15:
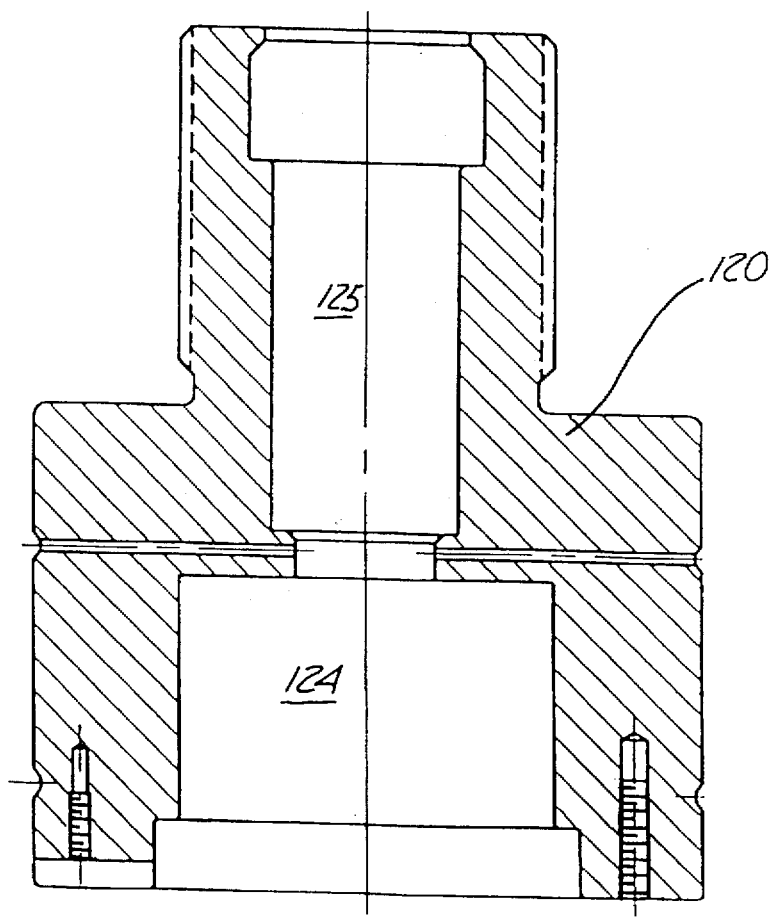
FIG. 15 is a cross-sectional view of the punch body element of FIG. 14.

FIGS. 14 and 15 depict a punch assembly 115 in accordance with another embodiment of the invention. The assembly 115 is an adjustable length punch set assembly of the type disclosed in U.S. Pat. No. 5,329,835 entitled ADJUSTABLE LENGTH PUNCH SET ASSEMBLY, the disclosure of which is herein incorporated by reference. The punch has a punch driver 130 that is threadingly attached to a punch body 120. An adjustment element 138 is positioned in a cavity 133 in the punch driver and extends upwardly through an opening 136 in the punch driver 130. The adjustment element 138 has a number of teeth 139 spaced around the perimeter of its lower section that engage corresponding teeth 137 of the punch guide 130 and corresponding dimples 127 of the punch body 120. In operation, the teeth 139 disengage the teeth 137 as the adjustment element 138 is depressed downwardly, which allows rotational movement between the punch driver 130 and the punch body 120. The length of the punch can be adjusted as described in U.S. Pat. No. 5,329,835 by controlling the extent of rotation between the punch driver 130 and the punch body 120.

The punch body 120 has a chamber 124 and an axial bore 125 (best shown in FIG. 15), and it is received within a punch guide 126 for axial, reciprocal movement therein. A head ring 134 is attached to the upper end of the punch driver by a number of set screws 132, and a spring ring 128 is attached to the upper end of the punch guide 126 by a number of slightly larger set screws 129. A high-bias spring 132 is positioned between the head ring 134 and the spring ring 128 for biasing the punch body 120 and the punch driver 130 axially upwardly into the raised position.

The punch 115 has an axial locking mechanism which includes a moveable locking element 170 positioned in the chamber and axial bore, 124 and 125, and a fixed locking element 140 attached to the bottom of the punch body 120. The moveable locking element 170 has a generally horizontal plate 175 from which an annular appendage 176 depends downwardly into the chamber 124. A tool socket 173 extends upwardly from the plate 175 into the bore 125. The plate 175 and appendage 176 define a cavity 177 in the moveable locking element 170. A number of openings 172 and platforms 174 are positioned about the appendage 176, and each platform 174 defines the bottom surface of an opening 172.

The fixed locking element 140 is attached to the bottom of the punch body 120 by a number of bolts 118 (only one bolt 118 is shown in the cross-sectional view of FIG. 14). The fixed locking element 140 has an annular retaining wall 142 extending upwardly into the cavity 177 of the moveable locking element 170. The retaining wall 142 has a cylindrical outer surface 146 that is spaced inwardly from the inner wall that defines the chamber 124 and an inner surface 144 that defines the tool receiving basin 150. The appendage 176 of the moveable locking element 170 is precisely received in the space between the outer surface 146 of the retaining wall 142 and the inner wall that defines the chamber 124. Only a small portion of the chamber 124 under the appendage 176 remains unoccupied by either the moveable locking element 170 or the fixed locking element 140 when the moveable locking element 170 is in the raised position as shown in FIG. 14. The fixed locking element 140 also has a rim 148 which faces downwardly and is positioned substantially normal to the axial movement of the punch 115.

A number of holes 160 are positioned about the retaining wall 142 in alignment with the openings 172. Each hole 160 receives a bearing 155 and has a retaining surface for preventing the bearing from entering the tool receiving basin 150. The retaining surface is a lip positioned towards the inner surface 144 of the retaining wall 146 that angles convergently towards the longitudinal axis of the punch 115.

The tool piece 190 of the punch 115 has a compression surface 200 defined by the upper surface of a brim 197. The compression surface 200 faces upwardly and is positioned substantially normal to the axial movement of the punch 115 to engage the rim 148 of the fixed locking element 140. The tool piece 190 also includes a removable shank 192 that has cylindrical upper and lower stabilizing surfaces 197, 198 and a retaining surface 196 positioned therebetween. The upper and lower stabilizing surfaces 197, 198 mate with the inner surfaces of the lower section of the tool receiving basin 150 that is defined by the inner surface 144 of the fixed locking element 140. The retaining surface 196 is configured so that it extends convergently towards the lower end of the punch 115. In a preferred embodiment, the retaining surface 96 is an inverted, truncated cone having its base at the upper retaining surface 197 and its truncated tip terminating at the lower retaining surface 198.

FIG. 14 depicts the punch 155 in the locked position in which the moveable locking mechanism 170 is held against the ceiling of the chamber 124 by a spring 180. In a preferred embodiment, the spring 180 is a wave spring. The platforms 174 urge the bearings 155 radially inwardly and hold the bearings in contact with the retaining surface 196 when the moveable locking mechanism 170 is in the locked position. The shank 192, therefore, is prevented from sliding out of the tool receiving basin 150 because the upper portion of the retaining surface 196 and the upper stabilizing surface 197 cannot pass beyond the bearings 155. The shank 192 is positioned relative to the tool piece 190 so that the rim 148 of the fixed locking element 140 abuts the compression surface 200 of the rim 195 when the bearings 155 engage the retaining surface 196.

In operation, a tool piece 190 is removed from the punch 115 by inserting a tool such as a screw driver through the axial bore 125, engaging the tip of the tool with the tool socket 173 and pushing the moveable locking element 170 downwardly within the chamber until the openings 172 are aligned with the bearings 155. The tool piece is then removed by simply sliding the shank 192 out of the tool receiving basin 150. A tool piece 190 is attached to the punch in a similar manner by first depressing the moveable locking mechanism 170 until the openings 172 are aligned with the bearings 155, sliding the shank 192 into the tool receiving basin 150, and then releasing the moveable locking mechanism 170 so that the spring 180 can push it upwardly into the locked position.

While a preferred embodiment of the present invention has been described, it should be understood that various changes, adaptations and modifications may be made therein without departing from the spirit of the invention and the scope of the appended claims.

What is claimed is:

1. A punch assembly for use in a punch press, comprising:

a punch body having a longitudinal axis and upper and lower ends;

a fixed locking element positioned at the lower end of the punch body and having an annular retaining wall defining a tool receiving basin and having an inner surface, a plurality of circumferentially spaced holes extending through the annular wall and communicating with the basin, the wall having a lower rim positioned substantially normal to the longitudinal axis of the punch body, a plurality of bearings positioned within the holes and moveable between locked positions in which a part of each bearing extends into the tool receiving basin and released positions in which each bearing is retracted from the basin;

a removable tool having a shank receivable upwardly in the tool receiving basin and having an annular shoulder positioned to engage the rim of the annular retaining wall; and a movable locking element rotatably mounted to the fixed locking element and having a plurality of alternating inwardly facing bearing-receiving recesses and bearing-engaging platforms positioned at circumferential increments and being rotatable with respect to the annular retaining wall between a released position wherein said recesses are aligned with the respective holes to receive the bearings and a locked position wherein the platforms engage the bearings to position the bearings in their locked positions, and detent means to restrain the locking element from rotating with respect to the retaining wall when the movable locking element is in its locked position, said detent means comprises exteriorly facing dimples formed said annular retaining wall, and a pin carried by the movable locking element and receivable in the dimples as the locking element is rotated with respect to the retaining wall.

2. The punch assembly of claim 1 wherein the movable locking element includes an exterior circumferential groove, and wherein said detent means includes a generally C shaped ring carried by the groove and having an end portion extending radially through an aperture in the movable locking element and defining said pin.

3. The punch assembly of claim 1, wherein the movable locking element includes three recesses and three platforms, and the fixed locking element includes three holes and three dimples; the recesses and the platforms being radially positioned about the movable locking element with respect to the position of the holes about the fixed locking element so that each platform is aligned with a corresponding hole when the pin engages one of the dimples.

4. The punch assembly of claim 3 wherein each recess and each platform has a center point, the center points of the recesses being positioned from each other at circumferential increments of 120°, and the center points of the platforms being positioned from each other at radial increments of 120° and from the center points of neighboring recesses at radial increments of 60°.

5. A punch assembly for use in a punch press, comprising:

a punch body having a longitudinal axis and upper and lower ends;

a fixed locking element positioned at the lower end of the punch body and having an annular retaining wall defining a tool receiving basin and having an inner surface, a hole extending through the annular wall and communicating with the basin, the wall having a lower rim positioned substantially normal to the longitudinal axis of the punch body, a bearing positioned within the hole and moveable between a locked position in which a part of the bearing extends into the tool receiving basin and a released position in which the bearing is retracted from the basin;

a removable tool having a shank receivable upwardly in the tool receiving basin and having an annular shoulder positioned to engage the rim of the annular retaining wall;

a movable locking element rotatably mounted to the fixed locking element and having an inwardly facing bearing-receiving recess and, circumferentially spaced therefrom, a bearing-engaging platform and being rotatable with respect to the fixed locking element between a released position wherein said recess is aligned with the hole to receive the bearing and a locked position wherein the platform engages the bearing to position the bearing in its locked position; and detent means to restrain the movable locking element from rotating with respect to the retaining wall when the movable locking element is in its locked position, said detent means comprising a series of circumferentially spaced dimples formed exteriorly on the retaining wall, and a pin carried by the movable locking element and removeably receivable in said dimples as the locking element is rotated with respect to the retaining wall.

\* \* \* \* \*